(12) United States Patent
Ito et al.

(10) Patent No.: US 12,305,745 B2
(45) Date of Patent: May 20, 2025

(54) DRIVE DEVICE

(71) Applicant: TOYOTA JIDOSHA KABUSHIKI KAISHA, Toyota (JP)

(72) Inventors: Eiji Ito, Toyota (JP); Koichi Okuda, Toyota (JP); Atsushi Tabata, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/442,536

(22) Filed: Feb. 15, 2024

(65) Prior Publication Data

US 2024/0418255 A1 Dec. 19, 2024

(30) Foreign Application Priority Data

Jun. 14, 2023 (JP) .................................. 2023-097601

(51) Int. Cl.
| | |
|---|---|
| *F16H 57/038* | (2012.01) |
| *F16H 57/02* | (2012.01) |
| *F16H 57/029* | (2012.01) |
| *F16H 57/04* | (2010.01) |

(52) U.S. Cl.
CPC ......... *F16H 57/038* (2013.01); *F16H 57/029* (2013.01); *F16H 57/0424* (2013.01); *F16H 57/0476* (2013.01); *F16H 57/0495* (2013.01); *F16H 2057/02034* (2013.01); *F16H 2057/02052* (2013.01)

(58) Field of Classification Search
CPC .. F16H 2057/02034; F16H 2057/0476; H02K 7/006; H02K 5/225
See application file for complete search history.

(56) References Cited

U.S. PATENT DOCUMENTS

| | | | |
|---|---|---|---|
| 12,101,003 B2 * | 9/2024 | Fujimoto | .............. F16H 57/027 |
| 2023/0113748 A1 * | 4/2023 | Inoue | ....................... H02K 3/50 |
| | | | 310/54 |

FOREIGN PATENT DOCUMENTS

| | | |
|---|---|---|
| CN | 209813696 U | 12/2019 |
| JP | 2004-050886 A | 2/2004 |

\* cited by examiner

*Primary Examiner* — Jake Cook
(74) *Attorney, Agent, or Firm* — SoraIP, Inc.

(57) ABSTRACT

A drive device installed in a vehicle includes a case including an electric motor chamber, a terminal block chamber, and a gear chamber, an electric motor, a terminal block, a speed reducer, and a hypoid gear. A first through hole is provided in a partition wall between the electric motor chamber and the terminal block chamber. A second through hole is provided in a partition wall between the terminal block chamber and the gear chamber. The electric motor includes a rotor shaft extending from the electric motor chamber through the first through hole, the terminal block chamber, and the second through hole, to the gear chamber. A gap between the rotor shaft and the second through hole is sealed by an oil seal. A first lubricating oil is accommodated in the electric motor chamber and the terminal block chamber. A second lubricating oil is accommodated in the gear chamber.

5 Claims, 6 Drawing Sheets

DRIVE DEVICE

CROSS-REFERENCE TO RELATED APPLICATION

This application claims priority to Japanese Patent Application No. 2023-097601 filed on Jun. 14, 2023, incorporated herein by reference in its entirety.

BACKGROUND

1. Technical Field

Technology disclosed in the present specification relates to a drive device.

2. Description of Related Art

Japanese Unexamined Patent Application Publication No. 2004-050886 (JP 2004-050886 A) discloses a drive device for driving wheels of a vehicle. The drive device includes an electric motor housed in an electric motor chamber, and gears housed in a gear chamber. The gears in the gear chamber include a speed reducer and a hypoid gear. The gear chamber is disposed next to the electric motor chamber. The wheels rotate by driving force of the electric motor being transmitted to a drive shaft via the gears. Further, the drive device includes a terminal block for supplying electric power to the electric motor. A terminal block chamber housing the terminal block is provided on an opposite side from the gear chamber, with the electric motor chamber interposed therebetween. That is to say, the electric motor chamber is disposed between the terminal block chamber and the gear chamber.

SUMMARY

In order to shorten the overall length of the drive device, the terminal block chamber can be provided between the electric motor chamber and the gear chamber. In the present specification, technology is proposed for improving insulation properties of a terminal block in a drive device, in which a terminal block chamber is provided between an electric motor chamber and a gear chamber.

A drive device disclosed in the present specification is installed in a vehicle. The drive device includes a case, an electric motor, a terminal block, a speed reducer, and a hypoid gear. The case includes an electric motor chamber, a terminal block chamber, and a gear chamber. The electric motor is housed in the electric motor chamber. The terminal block is housed in the terminal block chamber and is electrically connected to the electric motor. The speed reducer is disposed in the gear chamber. The hypoid gear is disposed in the gear chamber. A first through hole is provided in a partition wall between the electric motor chamber and the terminal block chamber. A second through hole is provided in a partition wall between the terminal block chamber and the gear chamber. The electric motor includes a rotor shaft extending from the electric motor chamber through the first through hole, the terminal block chamber, and the second through hole, to the gear chamber. A configuration is made such that rotation of the rotor shaft is transmitted to wheels of the vehicle via the speed reducer and the hypoid gear. A gap between the rotor shaft and the second through hole is sealed by an oil seal. A first lubricating oil is accommodated in the electric motor chamber and the terminal block chamber. A second lubricating oil is accommodated in the gear chamber.

Note that the speed reducer and the hypoid gear may be laid out in any order. For example, the rotation of the rotor shaft may be transmitted in the order of the speed reducer, the hypoid gear, and the wheels, or the rotation of the rotor shaft may be transmitted in the order of the hypoid gear, the speed reducer, and the wheels.

In this drive device, the terminal block chamber and the gear chamber are separated by an oil seal. Accordingly, a lubricating oil different from that in the electric motor chamber and the terminal block chamber can be accommodated in the gear chamber. Thus, the second lubricating oil that is suitable for lubricating the gears can be used in the gear chamber, and the first lubricating oil suitable for lubricating the electric motor can be used in the electric motor chamber. Also, the first lubricating oil is also accommodated in the terminal block chamber, and accordingly an oil film of the first lubricating oil is formed on a surface of the terminal block. Thus, insulating properties of the terminal block are improved, and the size of the terminal block can be reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Additional features of the drive device disclosed herein are listed below.

The first lubricating oil may circulate between the electric motor chamber and the terminal block chamber during operation of the electric motor.

According to this configuration, the electric motor can be effectively cooled by the first lubricating oil.

The viscosity of the first lubricating oil may be lower than the viscosity of the second lubricating oil.

According to this configuration, since the viscosity of the second lubricating oil is high, the oil film shortage on the tooth surface of the gear is suppressed. In addition, since the viscosity of the first lubricating oil is low, the rotor of the electric motor can be rotated with low loss. In addition, since the viscosity of the first lubricating oil is low, the oil film of the first lubricating oil is easily formed on the surface of the terminal block, and the insulating property of the terminal block can be effectively improved.

The oil seal may have a first seal portion in contact with the outer peripheral face of the rotor shaft and the inner peripheral face of the second through hole, and a second seal portion in contact with the outer peripheral face of the rotor shaft and the inner peripheral face of the second through hole at a position closer to the gear chamber than the first seal portion.

According to this configuration, it is possible to effectively suppress the leakage of the lubricating oil in the oil seal.

The case may be provided with an oil discharge passage that opens to the inner peripheral face of the second through hole at a position between the first seal portion and the second seal portion.

According to this configuration, it is possible to more effectively suppress the leakage of the lubricating oil in the oil seal.

Example 1

Figure 1:
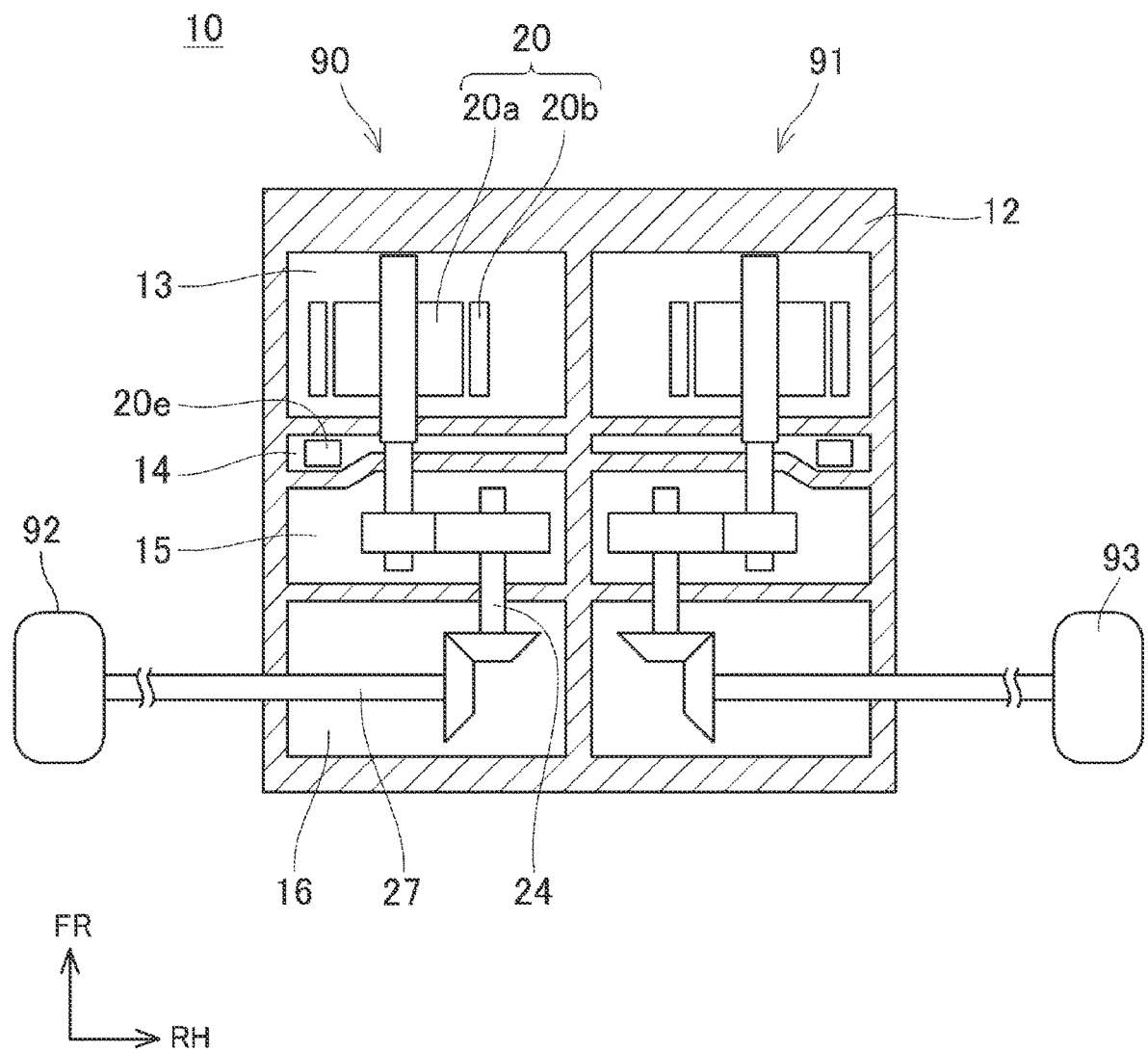
FIG. 1 is a cross-sectional view of a drive device according to a first embodiment taken along a left-right direction.

The drive device 10 of the first embodiment shown in FIG. 1 is mounted on an electrified vehicle. Note that in FIG. 1, the arrow FR indicates the vehicle front direction, and the arrow RH indicates the vehicle right direction. The drive device 10 includes a case 12. A left drive system 90 and a right drive system 91 are provided inside the case 12. The left drive system 90 drives the left rear wheel 92 of electrified vehicle. The right drive system 91 drives the right rear wheel 93 of electrified vehicle. Since the left drive system 90 and the right drive system 91 are symmetrical, the left drive system 90 will be described below.

Inside the case 12, a left electric motor chamber 13, a left terminal block chamber 14, a left counter gear chamber 15, and a left hypoid gear chamber 16 are provided. The left terminal block chamber 14 is disposed behind the left electric motor chamber 13. The left counter gear chamber 15 is disposed behind the left terminal block chamber 14. The left hypoid gear chamber 16 is located behind the left counter gear chamber 15. An electric motor 20 is accommodated in the left electric motor chamber 13. A terminal block 20e is accommodated in the left terminal block chamber 14. The terminal block 20e includes a terminal for supplying electric power to the electric motor 20. A gear set constituting the counter gear is accommodated in the left counter gear chamber 15. A gear set constituting the hypoid gear is accommodated in the left hypoid gear chamber 16. The left drive system 90 is constituted by the electric motor 20, a gear set in the left counter gear chamber 15, a gear set in the left hypoid gear chamber 16, and the like.

Figure 2:
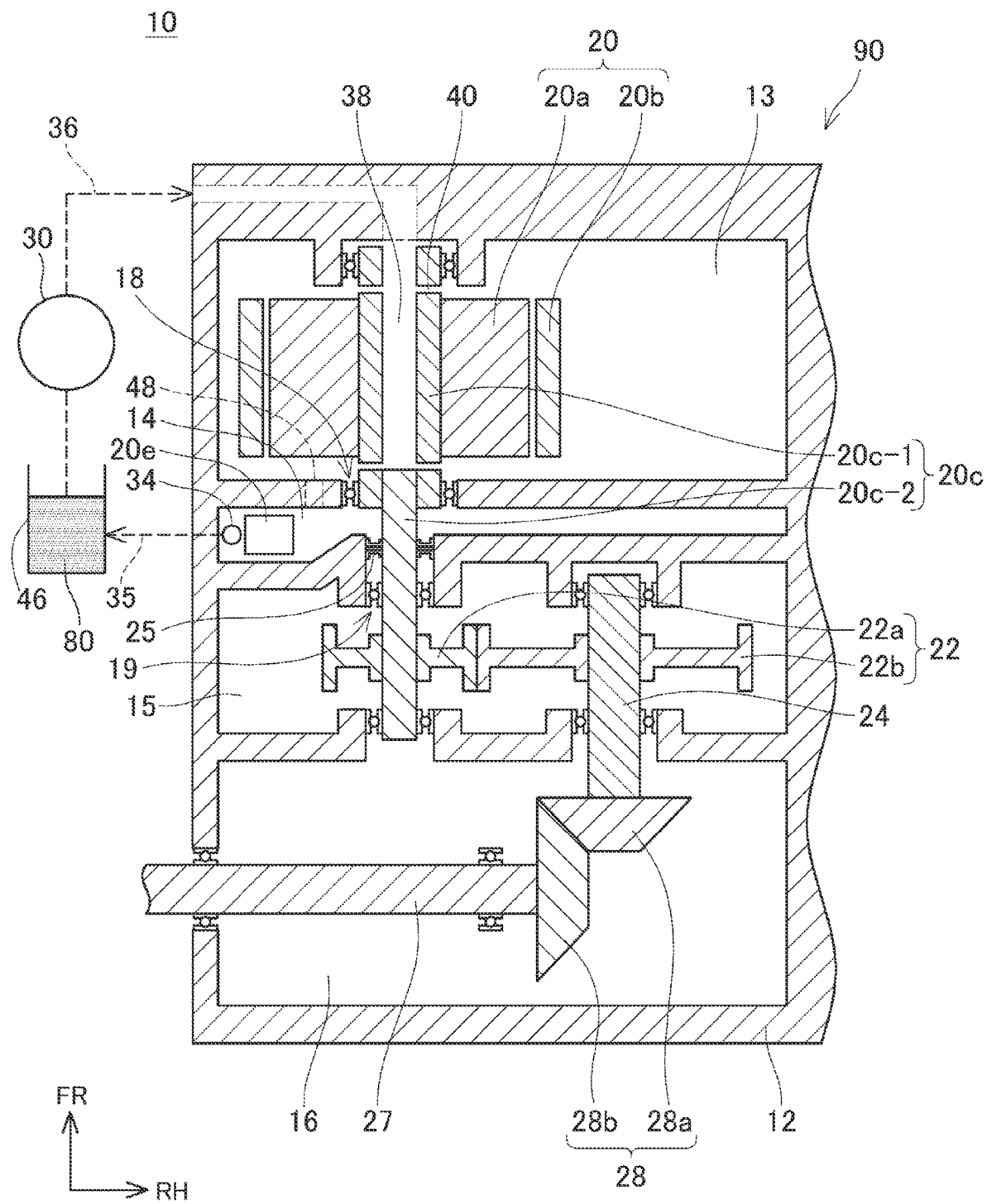
FIG. 2 is a cross-sectional view of the left drive system 90 along the left-right direction.

As shown in FIG. 2, the electric motor 20 has a rotor 20a and a stator 20b. The rotor 20a has a rotor shaft 20c. The rotor shaft 20c has a shaft 20c-1 and a shaft 20c-2. The shaft 20c-1 has a cylindrical configuration. The shaft 20c-2 has a cylindrical shape. One end of the shaft 20c-2 is inserted into the shaft 20c-1. The shaft 20c-2 is fixed to the shaft 20c-1 by a spline-fit. The rotor 20a is accommodated in the left electric motor chamber 13 in a direction in which the rotor shaft 20c extends along the front-rear direction of electrified vehicle. A through hole 18 is provided in a partition wall between the left electric motor chamber 13 and the left terminal block chamber 14. A through hole 19 is provided in a partition wall between the left terminal block chamber 14 and the left counter gear chamber 15. The rotor shaft 20c extends from the left electric motor chamber 13 to the left counter gear chamber 15 through the through hole 18, the left terminal block chamber 14, and the through hole 19. More specifically, the shaft 20c-1 extends from the left electric motor chamber 13 to the left terminal block chamber 14, and the shaft 20c-2 extends from the left terminal block chamber 14 to the left counter gear chamber 15. The rotor 20a is rotatably supported by a bearing provided in the case 12. A gap between the outer peripheral face of the shaft 20c-2 and the inner peripheral face of the through hole 19 is sealed by an oil seal 25. The stator 20b is disposed around the rotor 20a. The stator 20b is electrically connected to the terminal block 20e. When a current is supplied to the stator 20b via the terminal block 20e, the rotor 20a rotates.

An output shaft 24 is disposed in the left counter gear chamber 15. The output shaft 24 is arranged parallel to the rotor shaft 20c. More specifically, the central axis of the output shaft 24 is parallel to the central axis of the rotor shaft 20c. The output shaft 24 is rotatably indicated by a bearing provided in the case 12. The output shaft 24 extends through the partition wall between the left counter gear chamber 15 and the left hypoid gear chamber 16 from the left counter gear chamber 15 to the left hypoid gear chamber 16. The output shaft 24 is rotatably indicated by a bearing provided in the case 12.

The gear set provided in the left counter gear chamber 15 has a gear 22a, 22b. The gear 22a is a cylindrical gear and is fixed to the rotor shaft 20c. The gear 22b is a cylindrical gear and is fixed to the output shaft 24. The gear 22a is engaged with the gear 22b. The counter gear 22 is constituted by a gear 22a and a gear 22b.

As the rotor shaft 20c rotates, the gear 22a rotates. When the gear 22a rotates, a driving force is transmitted from the gear 22a to the gear 22b. Therefore, the gear 22b and the output shaft 24 rotate. The gear ratio of the counter gear 22 is set such that the rotational speed of the output shaft 24 is slower than the rotational speed of the rotor shaft 20c. As described above, the drive system in the left counter gear chamber 15 constitutes the speed reducer.

A drive shaft 27 is disposed in the left hypoid gear chamber 16. The drive shaft 27 extends along the left-right direction of electrified vehicle. The drive shaft 27 extends from the left hypoid gear chamber 16 through the left side wall of the case 12 to the outside of the case 12. As shown in FIG. 1, a left rear wheel 92 is connected to a left end portion of the drive shaft 27. The drive shaft 27 is rotatably indicated by a bearing provided in the case 12.

As shown in FIG. 2, the gear set provided in the left hypoid gear chamber 16 has gears 28a, 28b. The gear 28a is a truncated conical gear and is fixed to the output shaft 24. The gear 28b is a truncated conical gear and is fixed to the drive shaft 27. The gear 28a is engaged with the gear 28b. The gear 28a and the gear 28b constitute a hypoid gear 28.

When the electric motor 20 is driven, the rotor shaft 20c rotates. As described above, as the rotor shaft 20c rotates, the output shaft 24 rotates. When the output shaft 24 rotates, the gear 28a rotates, and driving force is transmitted from the gear 28a to the gear 28b. Therefore, the gear 28b and the drive shaft 27 rotate. When the drive shaft 27 rotates, the left rear wheel 92 rotates. As described above, the left drive system 90 rotates the left rear wheel 92 by the driving force of the electric motor 20.

Figure 3:
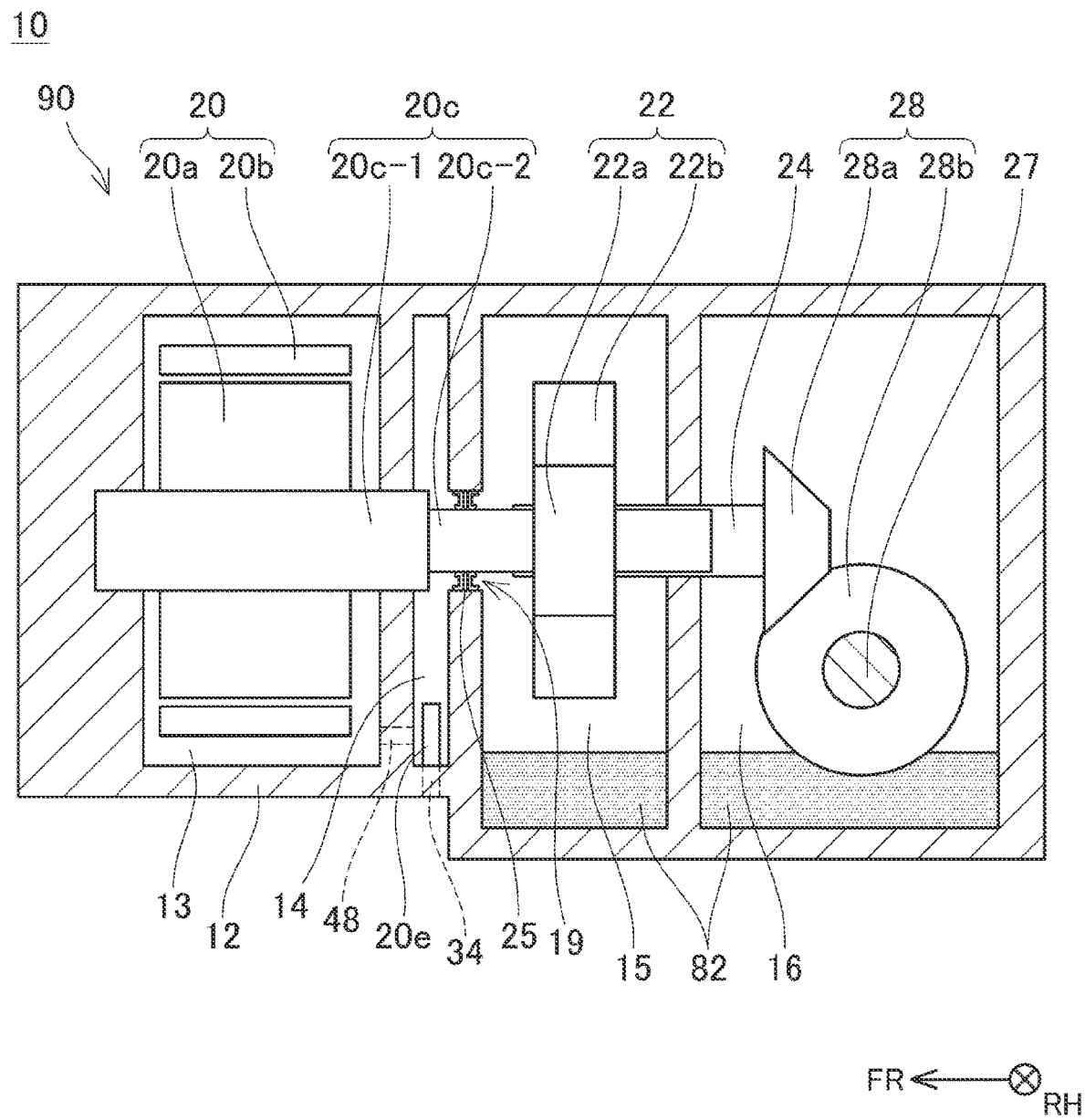
FIG. 3 is a cross-sectional view of the left drive system 90 taken along the vertical direction.

As shown in FIG. 2, the drive device 10 includes an oil storage tank 46. The oil storage tank 46 may be provided inside the case 12, or may be provided outside the case 12. The first lubricating oil 80 is stored in the oil storage tank 46. As will be described in detail later, the first lubricating oil 80 circulates in the left electric motor chamber 13 and the left terminal block chamber 14. As shown in FIG. 3, the second lubricating oil 82 is stored in the bottom portion of the left counter gear chamber 15 and the left hypoid gear chamber 16. The first lubricating oil 80 is a different type of lubricating oil from the second lubricating oil 82. The viscosity of the first lubricating oil 80 is lower than that of the second lubricating oil 82. The left counter gear chamber 15 and the left hypoid gear chamber 16 are connected at a position (not shown). Therefore, the second lubricating oil 82 can flow between the left counter gear chamber 15 and the left hypoid gear chamber 16. The space between the left terminal block chamber 14 and the left counter gear chamber 15 is separated by a partition wall except for the through hole 19. The through hole 19 is sealed by an oil seal 25. The oil seal 25 prevents lubricating oil from leaking between the left terminal block chamber 14 and the left counter gear chamber 15. As described above, the left terminal block chamber 14 and the left counter gear chamber 15 are separated from each other so that the lubricating oil is not mixed.

The lower portion of the gear 28b is immersed in the second lubricating oil 82. Therefore, when the gear 28b rotates, the second lubricating oil 82 is sprayed into the left counter gear chamber 15 and the left hypoid gear chamber 16. As a result, the gear 22a, 22b and the gear 28a, 28b are lubricated by the second lubricating oil 82. High pressure is applied to the tooth surfaces of each gear. In this embodiment, since the second lubricating oil 82 is highly viscous, the oil film on the tooth surfaces of the gear 22a, 22b and the gear 28a, 28b is prevented from being broken.

As shown in FIG. 2, the drive device 10 includes an oil discharge flow path 35 and an oil supply flow path 36. An oil discharge port 34 is formed at the bottom of the left terminal block chamber 14. An upstream end of the oil discharge flow path 35 is connected to the oil discharge port 34. The downstream end of the oil discharge flow path 35 is connected to the oil storage tank 46. An upstream end of the oil supply flow path 36 is connected to the oil storage tank 46. As described above, the shaft 20c-1 has a cylindrical configuration. The shaft flow path 38 is formed by the center hole of the shaft 20c-1. The downstream end of the oil supply flow path 36 is connected to the front end of the shaft flow path 38. An oil pump 30 is provided in the oil supply flow path 36. The oil pump 30 feeds the first lubricating oil 80 from the oil storage tank 46 toward the shaft flow path 38. The shaft 20c-1 is provided with a plurality of oil discharge ports 40 extending from the shaft flow path 38 to the outer peripheral face of the shaft 20c-1. The case 12 is provided with an oil flow path 48 that connects the left electric motor chamber 13 and the left terminal block chamber 14.

During operation of the electric motor 20, the oil pump 30 operates. When the oil pump 30 operates, the first lubricating oil 80 stored in the oil storage tank 46 is supplied to the shaft flow path 38 in the shaft 20c-1 via the oil supply flow path 36. The first lubricating oil flows rearward through the shaft flow path 38. The electric motor 20 is cooled by the first lubricating oil flowing in the shaft flow path 38. The first lubricating oil in the shaft flow path 38 is discharged from the oil discharge port 40 into the left electric motor chamber 13. The electric motor 20 is lubricated by the first lubricating oil discharged into the left electric motor chamber 13. The first lubricating oil discharged into the left electric motor chamber 13 flows through the oil flow path 48 to the left terminal block chamber 14. The terminal block 20e is cooled by the first lubricating oil. The first lubricating oil in the left terminal block chamber 14 flows through the oil discharge port 34 and the oil discharge flow path 35 to the oil storage tank 46. As described above, when the oil pump 30 is operated, the first lubricating oil circulates between the left electric motor chamber 13 and the left terminal block chamber 14. When the first lubricating oil circulates, the first lubricating oil is applied to the terminal block 20e. Therefore, an oil film of the first lubricating oil is formed on the terminal block 20e. Since the terminal block 20e is covered with the oil film of the first lubricating oil, the insulating property of the terminal block 20e is improved. In particular, since the first lubricating oil is less viscous, an oil film of the first lubricating oil is easily formed on the terminal block 20e. Therefore, it is possible to realize a highly insulating property in the terminal block 20e. Therefore, the insulating distance between the terminals of the terminal block 20e and the case 12 can be shortened. Thus, the drive device 10 can be miniaturized.

As described above, in the drive device 10 of the first embodiment, the left terminal block chamber 14 and the left counter gear chamber 15 are separated by the oil seal 25, and different lubricating oils are used in the separated chambers. The use of the second lubricating oil having a high viscosity in the left counter gear chamber 15 and the left hypoid gear chamber 16 prevents the oil film from being cut off on the tooth surfaces of the respective gears. Further, by using the low-viscosity first lubricating oil in the left electric motor chamber 13 and the left terminal block chamber 14, it is possible to efficiently circulate the first lubricating oil by the oil pump 30, the electric motor 20 and the terminal block 20e can be cooled efficiently. In addition, since the first lubricating oil is used in the left electric motor chamber 13, the rotor 20a can be rotated with low loss. Further, by using the first lubricating oil shared with the left electric motor chamber 13 (i.e., low-viscosity lubricating oil) for the left terminal block chamber 14, it is possible to effectively improve the insulating property of the terminal block 20e.

Figure 4:
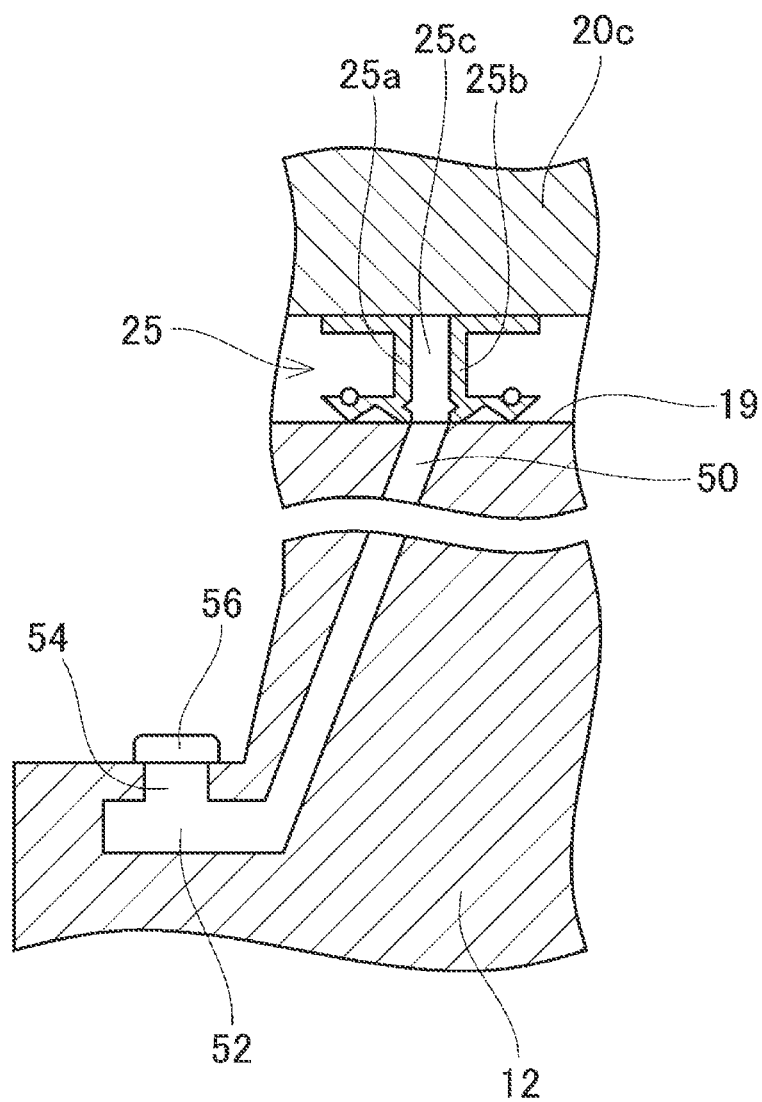
FIG. 4 is an enlarged cross-sectional view of the oil seal 25.

FIG. 4 shows a cross-section of the oil seal 25 and its periphery. As shown in FIG. 4, the oil seal 25 has a double lip structure that seals oil at two places on the seal portion 25a, 25b. The seal portion 25a is in contact with the outer peripheral face of the rotor shaft 20c and the inner peripheral face of the through hole 19. The seal portion 25b is disposed at a position close to the left counter-gear chamber 15 at a distance from the seal portion 25a. The seal portion 25b is in contact with the outer peripheral face of the rotor shaft 20c and the inner peripheral face of the through hole 19. In addition, the case 12 is formed with an oil discharge passage 50 that opens to the inner peripheral face of the through hole 19 in the space portion 25c between the seal portion 25a and the seal portion 25b. An oil reservoir 52 is provided at the other end of the oil discharge passage 50. The oil reservoir 52 is provided with a discharge port 54 connected to the outside of the case 12. The discharge port 54 is closed by a cap 56. The first lubricating oil may leak from the left terminal block chamber 14 beyond the seal portion 25a into the space portion 25c. Further, the second lubricating oil may leak from the left counter-gear chamber 15 beyond the seal portion 25b into the space portion 25c. The lubricating oil leaking into the space portion 25c in this way is discharged from the oil discharge passage 50 to the oil reservoir 52. The lubricating oil accumulated in the oil reservoir 52 is discharged from the discharge port 54 to the outside of the case 12 during maintenance. According to this configuration, it is possible to prevent the first lubricating oil from leaking from the left terminal block chamber 14 to the left counter gear chamber 15 and the second lubricating oil from leaking from the left counter gear chamber 15 to the left terminal block chamber 14.

The configuration of the gear may be different from that of the first embodiment. For example, the gears may be configured as in Embodiments 2 and 3 described below.

Figure 5:
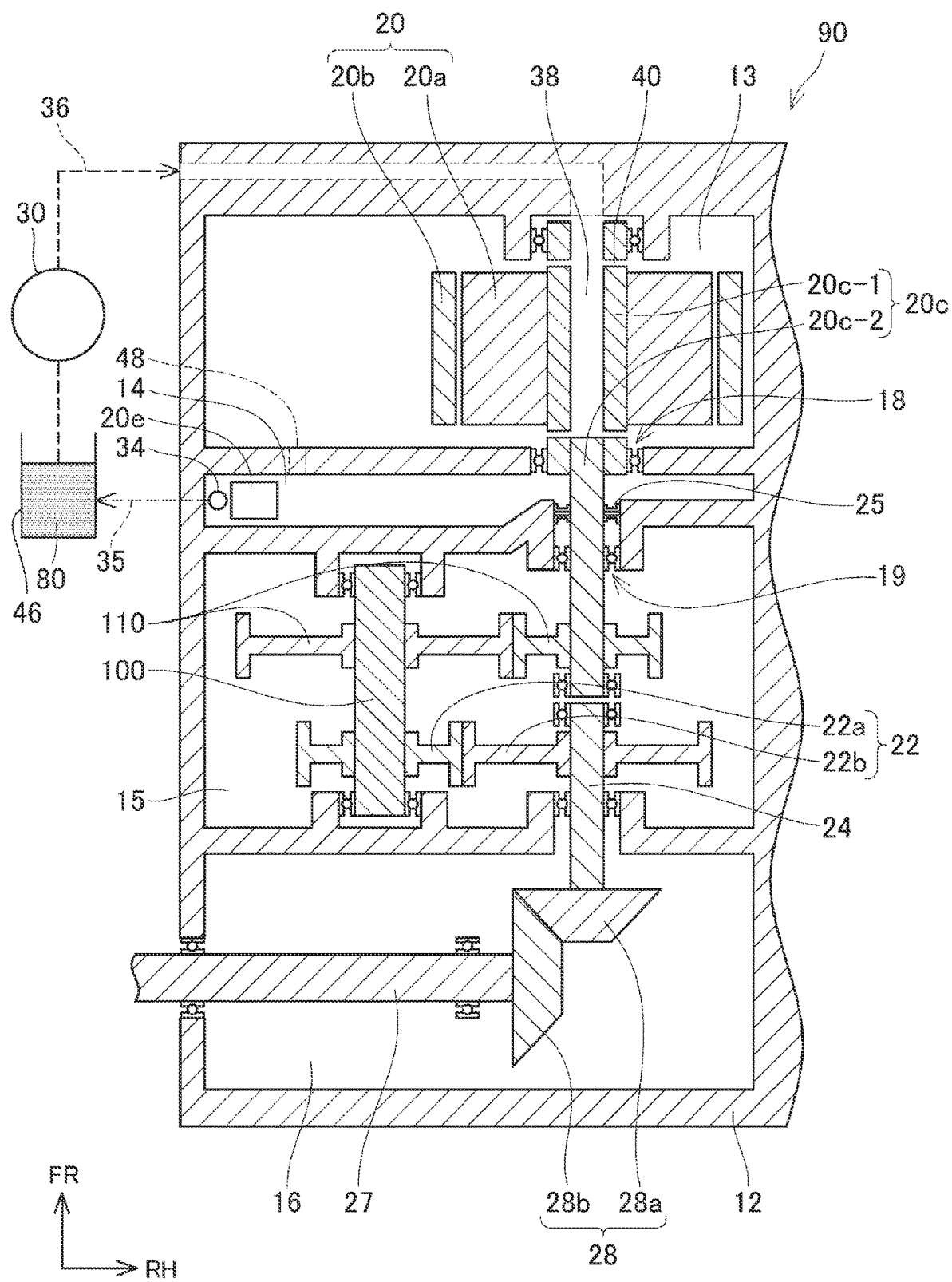
FIG. 5 is a cross-sectional view of a drive device according to a second embodiment.

FIG. 5 shows the drive device of the second embodiment. In the second embodiment, the counter shaft 100 and the counter gear 110 are accommodated in the left counter gear chamber 15. The counter gear 110 transmits the rotation of the rotor shaft 20c to the counter shaft 100. In the second embodiment, the output shaft 24 is disposed coaxially with the rotor shaft 20c. The counter gear 22 transmits the rotation of the counter shaft 100 to the output shaft 24. The other configuration of the second embodiment is the same as that of the first embodiment. As in the second embodiment, the drive device may have a plurality of counter gears.

Figure 6:
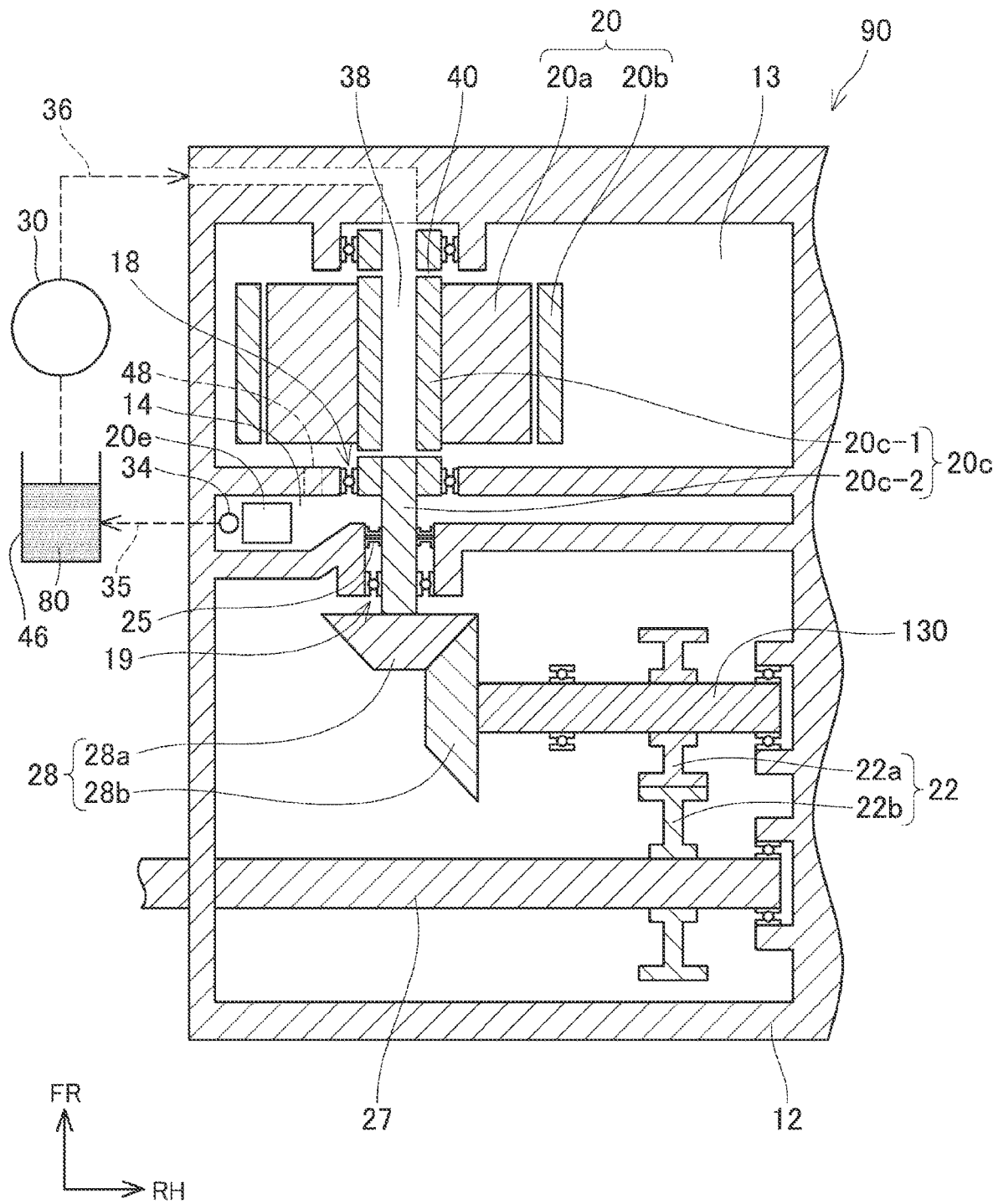
FIG. 6 is a cross-sectional view of a drive device according to a third embodiment.

FIG. 6 shows the drive device of the third embodiment. In the third embodiment, the intermediate shaft 130 is disposed in the gear chamber. The intermediate shaft 130 extends along the left-right direction of the vehicle. The hypoid gear 28 is provided between the rotor shaft 20c and the intermediate shaft 130. The hypoid gear 28 transmits the rotation of the rotor shaft 20c to the intermediate shaft 130. The counter gear 22 is provided between the intermediate shaft 130 and the drive shaft 27. The counter gear 22 transmits the rotation of the intermediate shaft 130 to the drive shaft 27. The other configuration of the third embodiment is the same as that of the first embodiment. As in the third embodiment, a counter gear may be provided at a subsequent stage of the hypoid gear.

Although the embodiments have been described in detail above, the embodiments are merely examples and do not limit the scope of claims. The techniques described in the claims include various modifications and alternations of the specific examples illustrated above. The technical elements described in the present specification or the drawings exhibit technical usefulness alone or in various combinations, and are not limited to the combinations described in the claims at the time of filing. In addition, the techniques illustrated in the present specification or the drawings achieve a plurality of objectives at the same time, and achieving one of the objectives itself has technical usefulness.

What is claimed is:

1. A drive device that is installed in a vehicle, the drive device comprising:
   a case that includes an electric motor chamber, a terminal block chamber, and a gear chamber;
   an electric motor that is housed in the electric motor chamber;
   a terminal block that is housed in the terminal block chamber and that is electrically connected to the electric motor;
   a speed reducer that is disposed in the gear chamber; and
   a hypoid gear that is disposed in the gear chamber, wherein
   a first through hole is provided in a partition wall between the electric motor chamber and the terminal block chamber,
   a second through hole is provided in a partition wall between the terminal block chamber and the gear chamber,
   the electric motor includes a rotor shaft extending from the electric motor chamber through the first through hole, the terminal block chamber, and the second through hole, to the gear chamber,
   a configuration is made such that rotation of the rotor shaft is transmitted to wheels of the vehicle via the speed reducer and the hypoid gear,
   a gap between the rotor shaft and the second through hole is sealed by an oil seal,
   a first lubricating oil is accommodated in the electric motor chamber and the terminal block chamber, and
   a second lubricating oil is accommodated in the gear chamber.

2. The drive device according to claim 1, wherein, during operation of the electric motor, the first lubricating oil circulates between the electric motor chamber and the terminal block chamber.

3. The drive device according to claim 1, wherein a viscosity of the first lubricating oil is lower than a viscosity of the second lubricating oil.

4. The drive device according to claim 1, wherein the oil seal includes a first seal portion that is in contact with an outer peripheral face of the rotor shaft and an inner peripheral face of the second through hole, and a second seal portion that is in contact with the outer peripheral face of the rotor shaft and the inner peripheral face of the second through hole at a position closer to the gear chamber than the first seal portion.

5. The drive device according to claim 4, wherein the case is provided with an oil discharge passage opening to the inner peripheral face of the second through hole, at a position between the first seal portion and the second seal portion.

* * * * *